US009269061B2

(12) United States Patent
Jeyapaul et al.

(10) Patent No.: US 9,269,061 B2
(45) Date of Patent: Feb. 23, 2016

(54) PERFORMANCE, ANALYTICS AND AUDITING FRAMEWORK FOR PORTAL APPLICATIONS

(75) Inventors: Jaganathan Jeyapaul, San Jose, CA (US); Pragnesh Shashikant Panchal, Santa Clara, CA (US); Brian James Lillie, Los Altos, CA (US)

(73) Assignee: Equinix, Inc., Redwood City, CA (US)

( * ) Notice: Subject to any disclaimer, the term of this patent is extended or adjusted under 35 U.S.C. 154(b) by 1424 days.

(21) Appl. No.: 12/964,677

(22) Filed: Dec. 9, 2010

(65) Prior Publication Data

US 2011/0145399 A1 Jun. 16, 2011

Related U.S. Application Data

(60) Provisional application No. 61/285,371, filed on Dec. 10, 2009, provisional application No. 61/323,066, filed on Apr. 12, 2010.

(51) Int. Cl.
*G06F 9/44* (2006.01)
*G06F 15/173* (2006.01)
*G06Q 10/06* (2012.01)
*G06F 11/30* (2006.01)
*G06F 21/60* (2013.01)
*G06F 11/34* (2006.01)

(52) U.S. Cl.
CPC ............ *G06Q 10/06* (2013.01); *G06F 11/3089* (2013.01); *G06F 21/604* (2013.01); *G06F 11/3438* (2013.01)

(58) Field of Classification Search
CPC ................ G06F 11/008; G06F 11/30–11/3495

USPC ................... 709/223–226; 717/127–129, 131
See application file for complete search history.

(56) References Cited

U.S. PATENT DOCUMENTS

| 5,170,391 A | 12/1992 | Arnold et al. |
| 6,345,239 B1 | 2/2002 | Bowman-Amuah |

(Continued)

FOREIGN PATENT DOCUMENTS

| EP | 2066081 A1 | 6/2009 |
| EP | 2510420 | 10/2012 |

(Continued)

OTHER PUBLICATIONS

Cross Reference to Related Applications Under 37 C.F.R. § 1.78, 2 pages, Aug. 1, 2011.

(Continued)

*Primary Examiner* — Emmanuel L Moise
*Assistant Examiner* — Julian Chang
(74) *Attorney, Agent, or Firm* — Shumaker & Sieffert, P.A.

(57) ABSTRACT

A performance, analytics and auditing (PAA) system is configured to operate with a complex web application including a portal application and its sub systems non-intrusively. The PAA system includes a first component configured to capture behavior-related information from the portal application, a second component configured to capture performance-related information from the portal application, a third component configured to capture auditing-related information from the portal application. The PAA system is further configured to start or stop with minimal impact on the portal application, wherein the PAA system is coded using Aspect Oriented Programming (AOP) and able to collect information from multiple threads.

19 Claims, 17 Drawing Sheets

(56) References Cited

U.S. PATENT DOCUMENTS

| | | | |
|---|---|---|---|
| 6,473,895 B1* | 10/2002 | Lopes et al. | 717/128 |
| 6,873,620 B1 | 3/2005 | Coveley et al. | |
| 7,096,193 B1 | 8/2006 | Beaudoin et al. | |
| 7,577,154 B1 | 8/2009 | Yung et al. | |
| 7,818,419 B1* | 10/2010 | McAllister et al. | 709/224 |
| 8,379,656 B2 | 2/2013 | Waldrop et al. | |
| 8,509,249 B2 | 8/2013 | Waldrop et al. | |
| 8,537,845 B2 | 9/2013 | Waldrop et al. | |
| 8,583,503 B2 | 11/2013 | Waldrop et al. | |
| 8,751,323 B2 | 6/2014 | Waldrop et al. | |
| 2001/0034789 A1 | 10/2001 | Kumagai et al. | |
| 2002/0032769 A1* | 3/2002 | Barkai et al. | 709/224 |
| 2002/0083179 A1 | 6/2002 | Shaw et al. | |
| 2002/0087679 A1* | 7/2002 | Pulley et al. | 709/224 |
| 2002/0174251 A1 | 11/2002 | Lasserre | |
| 2003/0055731 A1 | 3/2003 | Fouraker et al. | |
| 2003/0149653 A1 | 8/2003 | Penney et al. | |
| 2004/0081116 A1 | 4/2004 | Clay | |
| 2004/0111429 A1 | 6/2004 | Bou-Ghannam et al. | |
| 2004/0228354 A1 | 11/2004 | Anschutz et al. | |
| 2005/0185654 A1 | 8/2005 | Zadikian et al. | |
| 2006/0002370 A1 | 1/2006 | Rabie et al. | |
| 2006/0028998 A1 | 2/2006 | Lioy et al. | |
| 2006/0114915 A1 | 6/2006 | Kalkunte et al. | |
| 2006/0167891 A1* | 7/2006 | Blaisdell et al. | 707/10 |
| 2006/0245557 A1 | 11/2006 | Paden et al. | |
| 2006/0288106 A1 | 12/2006 | Kumar et al. | |
| 2007/0071029 A1 | 3/2007 | White et al. | |
| 2007/0260624 A1* | 11/2007 | Chung et al. | 707/101 |
| 2007/0291716 A1 | 12/2007 | Morales Barroso | |
| 2007/0291914 A1 | 12/2007 | Berge et al. | |
| 2008/0010545 A1* | 1/2008 | Tashiro et al. | 714/39 |
| 2008/0049621 A1 | 2/2008 | McGuire et al. | |
| 2008/0049748 A1 | 2/2008 | Bugenhagen et al. | |
| 2008/0062876 A1 | 3/2008 | Giroux et al. | |
| 2008/0107117 A1 | 5/2008 | Kulkarni et al. | |
| 2008/0144632 A1 | 6/2008 | Rabie et al. | |
| 2008/0151907 A1 | 6/2008 | Ge et al. | |
| 2008/0244150 A1 | 10/2008 | Sharma | |
| 2008/0301114 A1* | 12/2008 | Hibbets et al. | 707/5 |
| 2008/0301115 A1* | 12/2008 | Mattox et al. | 707/5 |
| 2008/0301170 A1* | 12/2008 | Laddha et al. | 707/102 |
| 2008/0301674 A1* | 12/2008 | Faus | 718/1 |
| 2009/0064333 A1* | 3/2009 | Saurabh et al. | 726/23 |
| 2009/0073988 A1 | 3/2009 | Ghodrat et al. | |
| 2009/0141703 A1 | 6/2009 | Ghodrat et al. | |
| 2009/0161569 A1* | 6/2009 | Corlett | 370/252 |
| 2009/0254880 A1* | 10/2009 | Gryko et al. | 717/109 |
| 2009/0288109 A1* | 11/2009 | Downey et al. | 725/14 |
| 2010/0002591 A1 | 1/2010 | Mizutani et al. | |
| 2010/0008365 A1 | 1/2010 | Porat | |
| 2010/0169971 A1* | 7/2010 | Raviv | 726/23 |
| 2010/0278042 A1* | 11/2010 | Monnes et al. | 370/230 |
| 2010/0281464 A1* | 11/2010 | Vajapeyam | 717/119 |
| 2010/0318918 A1 | 12/2010 | Mahmoodshahi | |
| 2011/0016379 A1* | 1/2011 | McColl et al. | 715/219 |
| 2011/0054920 A1* | 3/2011 | Phillips et al. | 705/1.1 |
| 2011/0058547 A1 | 3/2011 | Waldrop et al. | |
| 2011/0058565 A1 | 3/2011 | Waldrop et al. | |
| 2011/0060657 A1 | 3/2011 | Waldrop et al. | |
| 2011/0060846 A1 | 3/2011 | Waldrop et al. | |
| 2011/0067007 A1* | 3/2011 | Zamarreno | 717/128 |
| 2011/0145399 A1* | 6/2011 | Jeyapaul et al. | 709/224 |
| 2011/0161331 A1* | 6/2011 | Chung et al. | 707/751 |
| 2011/0209159 A1* | 8/2011 | Baratz et al. | 718/108 |
| 2011/0268435 A1 | 11/2011 | Mizutani et al. | |
| 2011/0320878 A1* | 12/2011 | Rosu et al. | 714/38.1 |
| 2012/0023190 A1 | 1/2012 | Backholm et al. | 709/217 |
| 2012/0106321 A1 | 5/2012 | Alon et al. | |
| 2012/0185597 A1* | 7/2012 | Luna | 709/225 |
| 2013/0013442 A1 | 1/2013 | Waldrop et al. | |
| 2013/0018753 A1 | 1/2013 | Waldrop et al. | |
| 2013/0198565 A1* | 8/2013 | Mancoridis et al. | 714/26 |
| 2013/0205020 A1* | 8/2013 | Broda et al. | 709/224 |

FOREIGN PATENT DOCUMENTS

| | | |
|---|---|---|
| JP | 2013504269 A | 2/2013 |
| WO | WO 2011/029030 | 3/2011 |
| WO | WO 2011/029047 A1 | 3/2011 |

OTHER PUBLICATIONS

Asante, Configuration of VLANS, pp. 1-8, Oct. 2008.

IEEE Std 802.1q—2005, *IEEE Standard for Local and metropolitan Area Networks—Virtual Bridged Local Area Networks: Provider Bridges*, 303 pages, May 2006.

PCT/US2010/047862 filed Sep. 3, 2010 Search Report dated Oct. 28, 2010.

PCT/US2010/047862 filed Sep. 3, 2010 Written Opinion dated Oct. 28, 2010.

PCT/US2010/047871 filed Sep. 3, 2010 Search Report dated Oct. 26, 2010.

PCT/US2010/047871 filed Sep. 3, 2010 Written Opinion dated Oct. 26, 2010.

PCT/US2010/047878 filed Sep. 3, 2010 Search Report dated Nov. 16, 2010.

PCT/US2010/047878 filed Sep. 3, 2010 Written Opinion dated Nov. 16, 2010.

PCT/US2010/047884 filed Sep. 3, 2010 Search Report dated Oct. 28, 2010.

PCT/US2010/047884 filed Sep. 3, 2010 Written Opinion dated Oct. 28, 2010.

PCT/US2010/059973 filed Dec. 10, 2010 Search Report dated Feb. 8, 2011.

PCT/US2010/059973 filed Dec. 10, 2010 Written Opinion dated Feb. 8, 2011.

The Metro Ethernet Forum, MEF 4, *Metro Ethernet Network Architecture Framework—Part 1: Generic Framework*, May 2004.

The Metro Ethernet Forum, Metro Ethernet Networks—A Technical Overview, 17 pages, version 2.1, Copyright 2002-2004.

The Metro Ethernet Forum, Technical Specification MEF 11, User Network Interface (UNI) Requirements and Framework, 34 pages, Nov. 2004.

The Metro Ethernet Forum, Technical Specification MEF 26, External Network Network Interface (ENNI)—Phase 1, 57 pages, Jan. 2010.

Non-Final Office Action for U.S. Appl. No. 12/875,039 mailed Jun. 15, 2012; 29 pages. U.S. Patent and Trademark Office, Alexandria, Virginia, USA.

Non-Final Office Action for U.S. Appl. No. 12/875,039 mailed Nov. 19, 2012; 22 pages. U.S. Patent and Trademark Office, Alexandria, Virginia, USA.

Non-Final Office Action for U.S. Appl. No. 12/875,042 mailed Dec. 20, 2012; 23 pages. U.S. Patent and Trademark Office, Alexandria, Virginia, USA.

Non-Final Office Action for U.S. Appl. No. 12/875,054 mailed Jun. 15, 2012; 22 pages. U.S. Patent and Trademark Office, Alexandria, Virginia, USA.

Notice of Allowance for U.S. Appl. No. 12/875,054 mailed Oct. 11, 2012; 11 pages. U.S. Patent and Trademark Office, Alexandria, Virginia, USA.

Non-Final Office Action for U.S. Appl. No. 13/614,865 mailed Jan. 9, 2013; 15 pages. U.S. Patent and Trademark Office, Alexandria, Virginia, USA.

*Ex Parte Wada and Murphy*, U.S. Patent and Trademark Office Board of Patent Appeals and Interferences Decision on Appeal for Appeal No. 2007-3733 dated Jan. 14, 2008, 9 pages. Alexandria, Virginia USA.

*Ex Parte Joseph Henry Vogel*, U.S. Patent and Trademark Office Board of Patent Appeals and Interferences Decision on Appeal for Appeal No. 2010-005339 dated Nov. 23, 2011, 13 pages. Alexandria, Virginia USA.

*Ex Parte Alain J. Cohen, et al.*, U.S. Patent and Trademark Office Board of Patent Appeals and Interferences Decision on Appeal for Appeal No. 2009-011366 dated Dec. 1, 2011, 20 pages. Alexandria, Virginia USA.

(56) References Cited

OTHER PUBLICATIONS

Notice of Allowance for U.S. Appl. No. 12/875,039 mailed Apr. 16, 2013, 26 pages, U.S. Patent & Trademark Office, Alexandria, Virginia USA.

Final Office Action for U.S. Appl. No. 12/875,042 mailed Aug. 12, 2013, 25 pages, U.S. Patent & Trademark Office, Alexandria, Virginia USA.

Non-Final Office Action for U.S. Appl. No. 13/614,841 mailed May 24, 2013, 7 pages, U.S. Patent & Trademark Office, Alexandria, Virginia USA.

Notice of Allowance for U.S. Appl. No. 13/614,865 mailed Apr. 29, 2013, 11 pages, U.S. Patent & Trademark Office, Alexandria, Virginia USA.

\* cited by examiner

PERFORMANCE, ANALYTICS AND AUDITING FRAMEWORK FOR PORTAL APPLICATIONS

RELATED APPLICATIONS

This application claims the benefit of and priority to U.S. Provisional Application titled "An Ethernet Exchange" filed on Dec. 10, 2009 having application Ser. No. 61/285,371 and U.S. Provisional Application titled "An Improved Ethernet Exchange" filed on Apr. 12, 2010 having application Ser. No. 61/323,066, both are incorporated by reference herein.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to co-location facility. More particularly, an aspect of an embodiment of the invention relates to monitoring and auditing information.

BACKGROUND OF THE INVENTION

Enterprise portal applications have a complex architecture which includes subsystems working together to deliver information to the end users. One goal of portal developers is to enable the users to have the best user experience possible. To achieve this goal, the portal developers may employ different tools. However, since each of these tools may have been developed for a single purpose, they tend to lack the ability to operate together in a cohesive manner. As a result, the information generated may not be as specific as necessary. For example, slow response experienced by a user of a portal application may be attributed to the portal application in general when, in actuality, the problem may be caused by a particular database transaction in the underlying subsystems.

SUMMARY OF THE INVENTION

For some embodiments, a monitoring performance, analyzing and auditing framework may be used to objectively quantify operational efficiency of enterprise applications. The enterprise applications may include portal applications. The portal applications may be implemented using various subsystems. The framework may include logic configured to monitor performance of subsystems, capture event details and capture behavior of users while interactions between the users and the portal applications occur. The framework may include logic that retrieves various types of information from different sources of the subsystems. The framework may also include logic to generate alerts whenever a predetermined condition is violated. Based on the information captured by the framework, reports may be generated. The framework may operate with existing portal applications with minimal or no modification to the subsystems.

BRIEF DESCRIPTION OF THE DRAWINGS

The drawings refer to embodiments of the invention in which.

Figure 1:
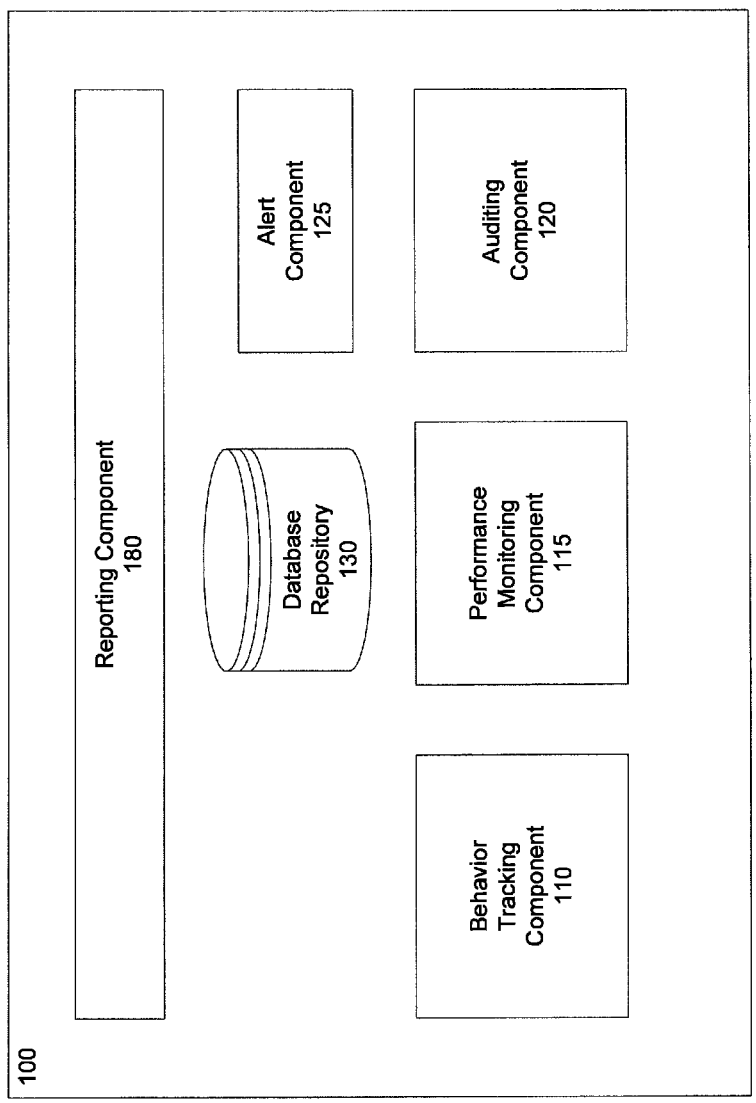
FIG. 1 is a block diagrams that illustrate an example embodiment of a performance, analytics and auditing framework.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DESCRIPTION

For some embodiments, methods and systems are described to enable an enterprise to more efficiently improve user experience when the users interact with the enterprise applications. The methods and systems improve existing techniques by using a framework that integrates behavior tracking functions, performance monitoring functions, and auditing functions such that these functions cohesively operate together to capture necessary information while interaction between the users and the enterprise applications occur. The framework is advantageous since it allows the captured information to be shared across the different functions, thus enabling more in depth analysis to be possible.

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description below.

Performance, Analytics and Auditing Framework

Typically, in order to capture performance, analytics and auditing information, system designers would generally use three different products, each one programmed to capture a different type of information. This would lead to a near impossible task of integrating the products and information together. Due to the fact that the data was collected by different systems, an administrator or support personnel would have to manually correlate the captured information. This is often impossible for high traffic sites.

FIG. 1 is a block diagram that illustrates an example embodiment of a performance, analytics and auditing framework. Framework 100 includes behavior tracking component 110, performance monitoring component 115, auditing component 120, alert component 125, database repository 130 and reporting component 180. These components work together to enable system administrator and/or support personnel to capture the most meaningful information from the underlying application. The framework 100 is referred to herein as a performance, analytics and auditing (PAA) framework. It may be noted that throughout this discussion, the term portal applications may be used to refer to software scripted to support operations of a portal, and a portal application may be referred to as a web-based application or an enterprise application.

The behavior tracking component 110 is configured to capture activities of users interacting with the portal applications. For example, it will collect all the activities that a user does on the portal such as login, logout, page visits, form submissions, various Asynchronous Javascript and XML (AJAX) actions, etc. The behavior tracking component 110 enables the framework to provide a unified view of the user's behavior and experience within a portal (or web site) by joining data across various subsystems that make up the portal. The portal applications may communicate with its subsystem using remote protocols such as, for example, web services.

The performance monitoring component 115 is configured to determine performance information relating to the activities of the users when interacting with the portal applications. This performance monitoring component 115 enables the framework 100 to monitor the portal application as a whole (in spite of its various subsystems) and measures the real time performance numbers at various subsystems of the portal application. For example, the performance monitoring component 115 will calculate the performance numbers of all the activities (e.g., login, logout, page visits, form submissions, etc.) of the users as captured by the behavior tracking component 110. The performance monitoring component 115 may also provide drill-down of the performance numbers at various subsystems such as, for example, the portlets, Javaserver Faces (JSF), database calls and web-service calls. The portlets are pluggable user interface software components that are managed and displayed in a web portal.

The auditing component 120 is configured to capture event details related to the operations performed by the users when the users interact with the portal applications. The auditing component 120 may collect all event details of critical events and tie this information with (1) the user that is involved in the events as well when the events occur (e.g., user identification (ID), browser and Internet Protocol (IP) addresses, timestamp, etc.) as captured by the behavior tracking component 110, and (2) the performance numbers at relevant levels as captured by the performance monitoring component 115. For example, when a user reported a problem interacting with the portal application, an administrator may be able to use the data captured by the PAA framework 100 and locate the user's session, page and event and quickly identify the root cause of the issue. As a result, user experience and satisfaction is improved. The behavior tracking component, the performance monitoring component and the auditing component may operate together in the framework collecting data seamlessly from multiple threads spawned for efficient parallel processing of user's requests within the portal application.

The alert component 125 is configured to communicate alerts and exceptions to the enterprise. For example, the alert component 125 may send out email alerts to a recipient such as, for example, an application owner, based on service level agreement (SLA) violation and/or based on occurrences of system exceptions or any predetermined events. The alert component 125 may also be configured to allows custom alerts to be generated.

The reporting component 180 is configured to generate reports associated with the information captured by one or more of the behavior tracking component, the performance monitoring component, the auditing component, and the alert component.

The PAA framework 100 also includes database repository 130 to store information generated by the behavior tracking component 110, the performance monitoring component 115, the auditing component 120, the alert component 125, and the reporting component 180.

For some embodiments, the PAA framework 100 can be configured to start or stop at runtime with minimal impact to the application such as a portal application. The PAA framework 100 can also be configured to trace each and every call/communication between components of the portal application to enable fine level tracing and debugging.

Portal Application Overview

Figure 2A:
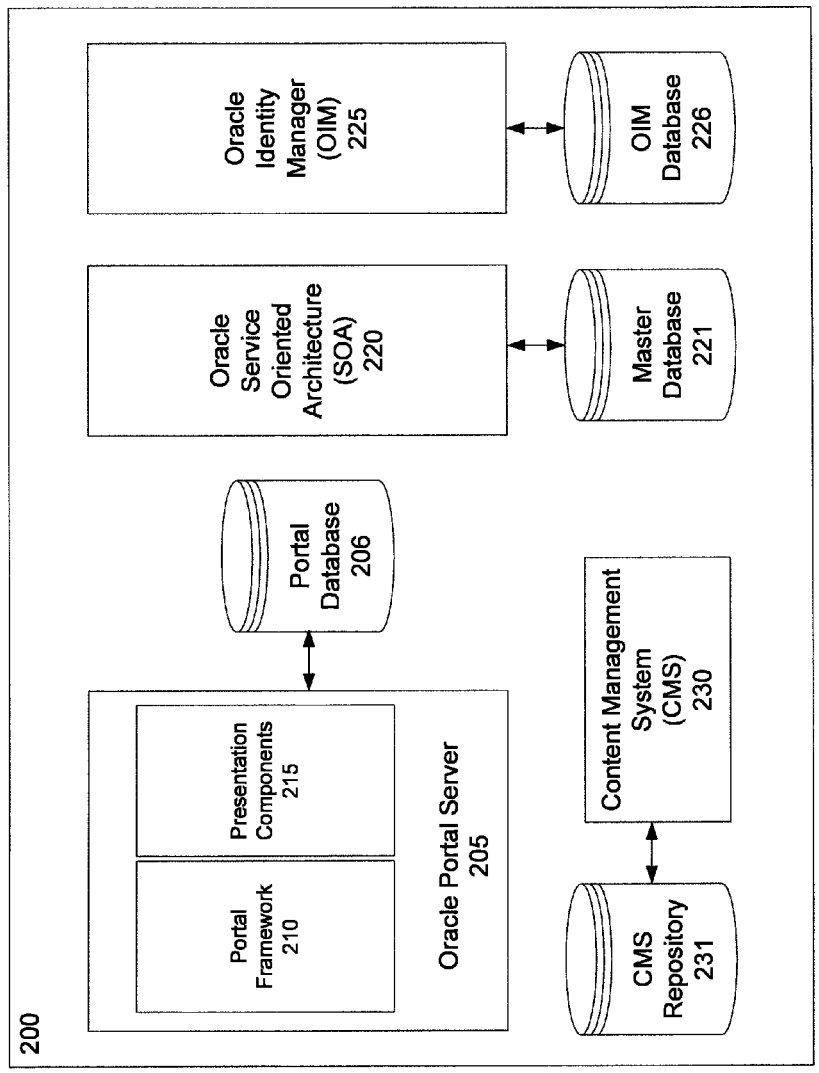
FIG. 2A is a block diagram that illustrates an example embodiment of a portal application.

FIG. 2A is a block diagram that illustrates an overview of an example embodiment of a portal application. Portal application 200 may operate with subsystems that include logic and database repositories to keep track of identities of the users, process transactions, store information related to the transactions, and so on. For example, the portal applications may be implemented using products from Oracle Corporation of Redwood Shores, Calif. These Oracle products may include Oracle E-Business Suite (EBS), Oracle Web logic Portal Server, Oracle Identity Manager (OIM), Oracle Service Oriented Architecture (SOA) Suite, etc.

The subsystem of the portal application 200 may include Oracle server portal 205. The server portal 205 may include portal framework 210 and presentation components 215. Coupled to the server portal 205 is portal database 206 configured to store portal related information used or generated by the server portal 205.

The subsystem of the portal application may also include Oracle service oriented architecture (SOA) suite 220 and its associated database 221, Oracle identity manager (OIM) 225 and its associated database 226, and content management system (CMS) 230 and its associated database 231.

The Oracle server portal 205 is a web-based application for building and deploying portals. It provides a secure, manageable environment for accessing and interacting with enterprise software services and information resources. The Oracle SOA suite 220 is a set of service infrastructure components for building, deploying, and managing SOAs. The Oracle SOA suite 220 enables system developers to set up and manage services and to orchestrate them into composite applications and business processes. The OIM 225 allows enterprises to manage end-to-end lifecycle of user identities across all enterprise resources both within and beyond the firewall. The CMS 230 provides a content management framework with the tools necessary to effectively manage web sites and maintain web content. Although not shown, the subsystems of the portal application 200 may include other components necessary to enable the portal applications to interact with the users.

PAA Framework and Portal Application

Figure 2B:
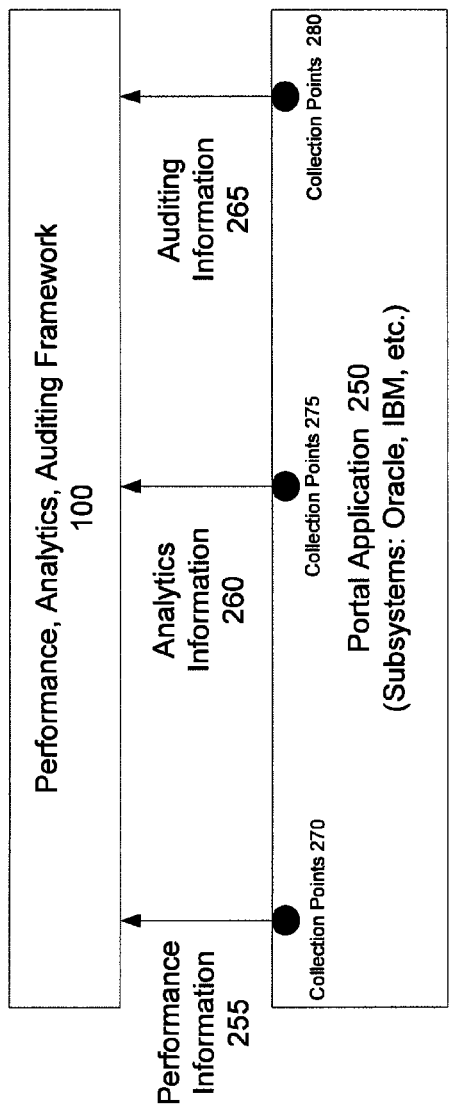
FIG. 2B is a block diagram that illustrates an example embodiment of an implementation of a performance, analytics and auditing framework with a portal application.

FIG. 2B is a block diagram that illustrates an example embodiment of an implementation of a performance, analytics and auditing framework with a portal application. For some embodiments, the PAA framework 100 operates with the portal application 250 non-intrusively using Aspect Oriented Programming (AOP). Aspect-oriented programming entails breaking down program logic into distinct parts (so-called concerns, cohesive areas of functionality). All programming paradigms support some level of grouping and encapsulation of concerns into separate, independent entities by providing abstractions (e.g. procedures, modules, classes, methods) that can be used for implementing, abstracting and composing these concerns. But some concerns defy these forms of implementation and are called crosscutting concerns because they "cut across" multiple abstractions in a program. Logging exemplifies a crosscutting concern because a logging strategy necessarily affects every single logged part of the system. Logging thereby crosscuts all logged classes and methods. All AOP implementations have some crosscutting expressions that encapsulate each concern in one place. The difference between implementations lies in the power, safety, and usability of the constructs provided. For example, interceptors that specify the methods to intercept express a limited form of crosscutting, without much support for type-safety or debugging. AspectJ has a number of such expressions and encapsulates them in a special class, an aspect. For example, an aspect can alter the behavior of the base code (the non-aspect part of a program) by applying advice (additional behavior) at various join points (points in a program) specified in a quantification or query called a pointcut (that detects whether a given join point matches). An aspect can also make binary-compatible structural changes to other classes, like adding members or parents.

Connection points in the portal application 250 may need to be identified so that appropriate information may be extracted by the PAA framework 100. These connection points may be points where information is communicated between two components of the portal applications. As illustrated in FIG. 2B, there may be one or more connection points 270 where performance-related information can be captured by the PAA framework 100. Similarly, there may be one or more connection points 275 where analytics information can be captured, and one or more connection points 280 where auditing information can be captured. For some embodiments, the PAA framework 100 may capture information from the connection points 270-280 using For some embodiments, the PAA framework 100 can be used in any Java/J2EE Application environment. One of the unique attributes of this framework is its capability to support complex, distributed and n-tiered Java/J2EE Applications environment. This enables the PAA framework 100 to be applicable to many different platforms. For example, the PAA framework 100 may operate with a portal application that is implemented using products from Oracle Corporation or from IBM Corporation.

Portal Application Example

Figure 3:
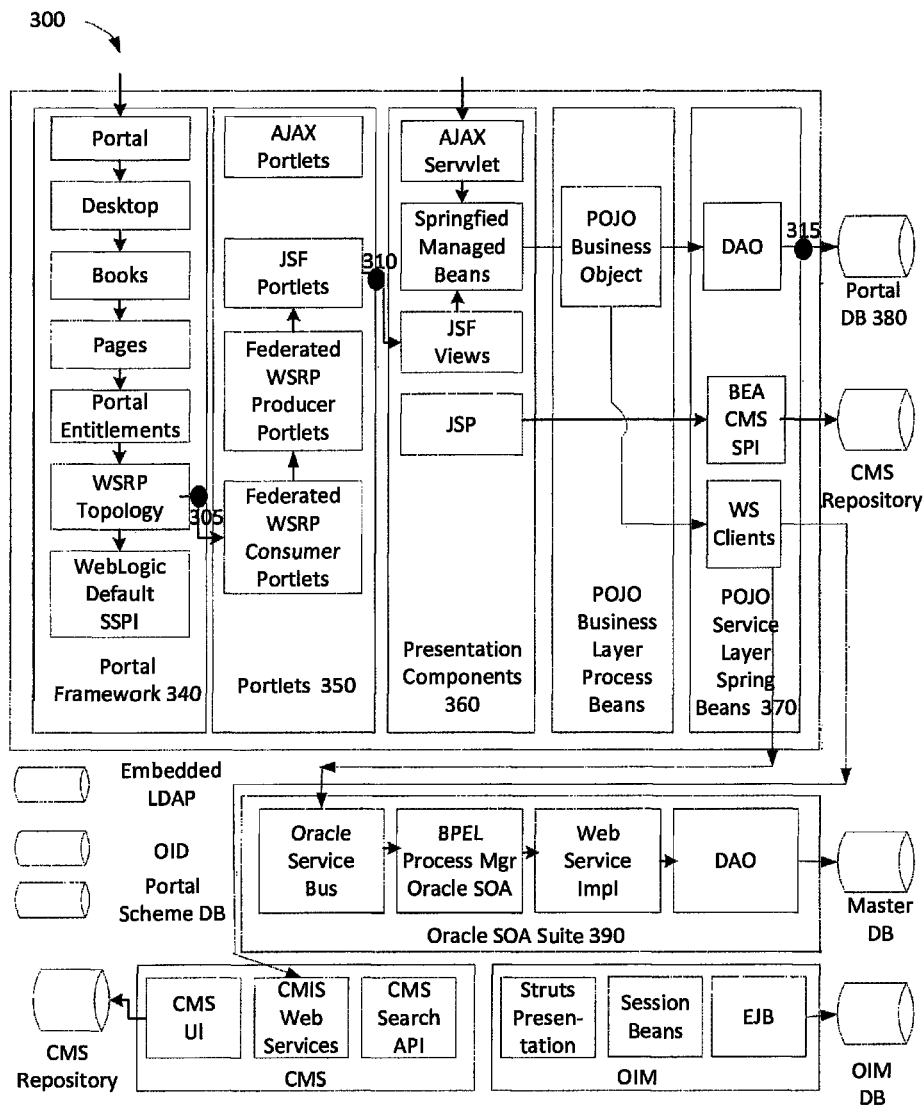
FIG. 3 is a block diagram that illustrates some details of an example embodiment of a portal application illustrated in FIG. 2A.

FIG. 3 is a block diagram that illustrates some details of an example embodiment of a portal application illustrated in FIG. 2A. The diagram 300 expands more on the blocks described above. The diagram 300 also illustrates various connection points between components of the portal application. For example, there is a connection point 305 between the portal framework component 340 and the portlets component 350. There is a connection point 310 between the portlets component 350 and the presentation components 360. Similarly, there is a connection point 315 between the component 370 and the database 380. Although not described, the diagram 300 also includes other components that may be part of a portal application, and as such, there may be many more other connection points.

For some embodiments, these connection points may be identified by referencing the technical guidelines of the portal applications and identifying appropriate communication requirements to connect and capture the necessary information. For example, connecting to or probing a connection point may include executing one or more programming instructions. For some embodiments, when the components of the portal applications communicate with one another, those communications may be traced across Java Virtual Machines (JVM). For example, a user activity within the portal application may cause multiple web-service calls, leading to multiple database calls. Performance information related to these interactions between the components may be captured spanning over several components and their communications. For example, instead of capturing information that merely indicates the portal is slow, the information captured by the PAA framework 100 at the connection point 315 may indicate that the database 380 is slow.

Connection Points Example

Figure 4:
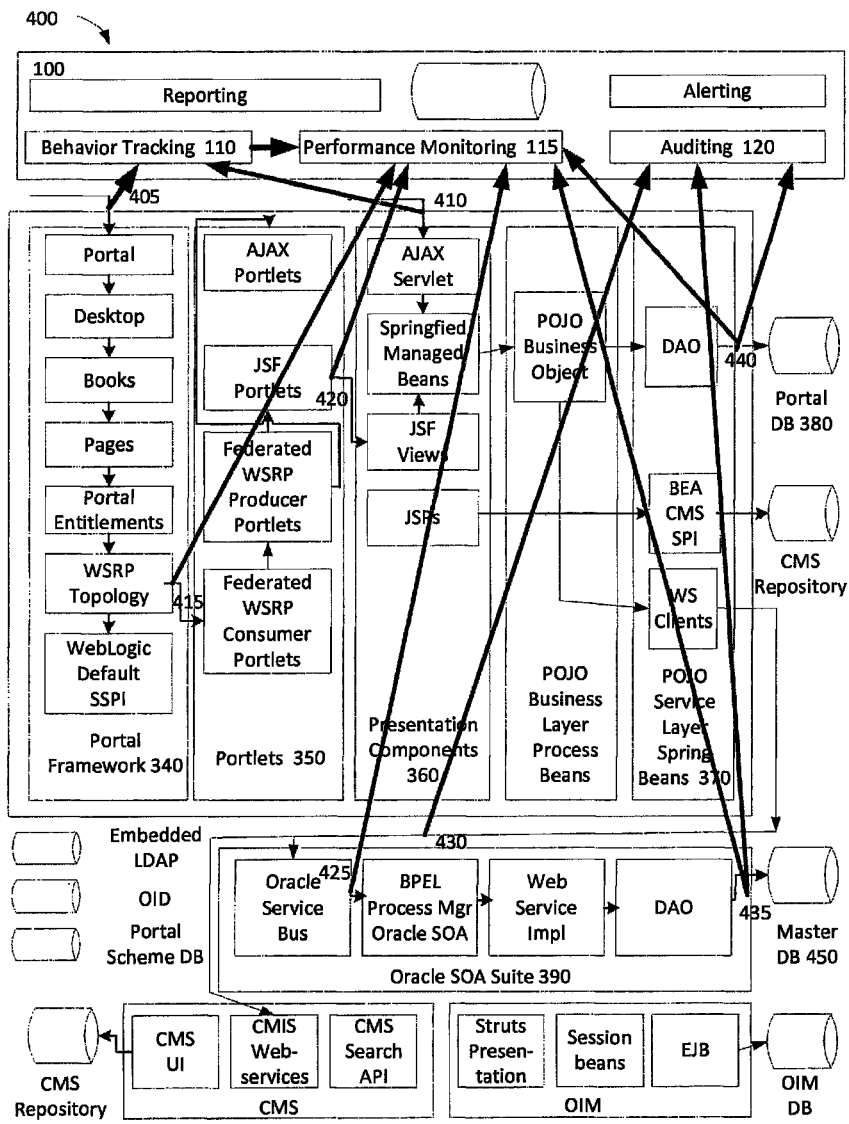
FIG. 4 is a block diagram that illustrates some details of an example embodiment of the implementation illustrated in FIG. 2B.

FIG. 4 is a block diagram that illustrates some details of an example embodiment of the implementation illustrated in FIG. 2B. Diagram 400 illustrates the PAA framework 100 and the portal application 300. There may be multiple connection points in the portal application 300 where information can be captured by the behavior tracking component 110, the performance monitoring component 115, and the auditing component 120. Correspondingly, there may be multiple threads from the PAA framework 100 executing to capture the information. For some embodiments, the behavior tracking component 110, the performance monitoring component 115 and the auditing component 120 operate together in the PAA framework 100 capturing information seamlessly from multiple threads spawned for efficient parallel processing of user's requests within the portal application.

For some embodiments, the PAA framework 100 leverages message queues such as, for example, asynchronous Java Message Service (JMS) queues, for minimum runtime overhead.

As illustrated in FIG. 4, the behavior tracking component 110 may capture information from the connection points 405, 410 associated with the portal framework 340 and the presentation components 360 respectively. The performance monitoring component 115 may capture information from the connection points 415, 420, 425, 435, and 440 associated with the portal framework 340, the portlets 350, the SOA suite 390, the master database 450, and the portal database 380, respectively. The auditing component 120 may capture information from the connection points 430, 435 and 440. Each of the lines connecting a connection point to a component of the PAA framework 100 is used to illustrate the flow of captured information. It may be noted that these lines are representative only, and the components of the PAA framework 100 may capture information at other connection points not illustrated in FIG. 4.

It may be noted that each of the connection points illustrated in FIG. 4 represents information flowing into or between components or subsystems of the portal application. It may also be noted that the operation of the PAA framework 100 may depend only on the information captured at these connection points. There is no interaction between a component of the portal application and a component of the PAA framework 100. This enables the PAA framework 100 to work with any portal applications. This also enables the PAA framework 100 to be turned on or off with minimal impact on the portal application.

Subcomponents of PAA Framework

Figure 5:
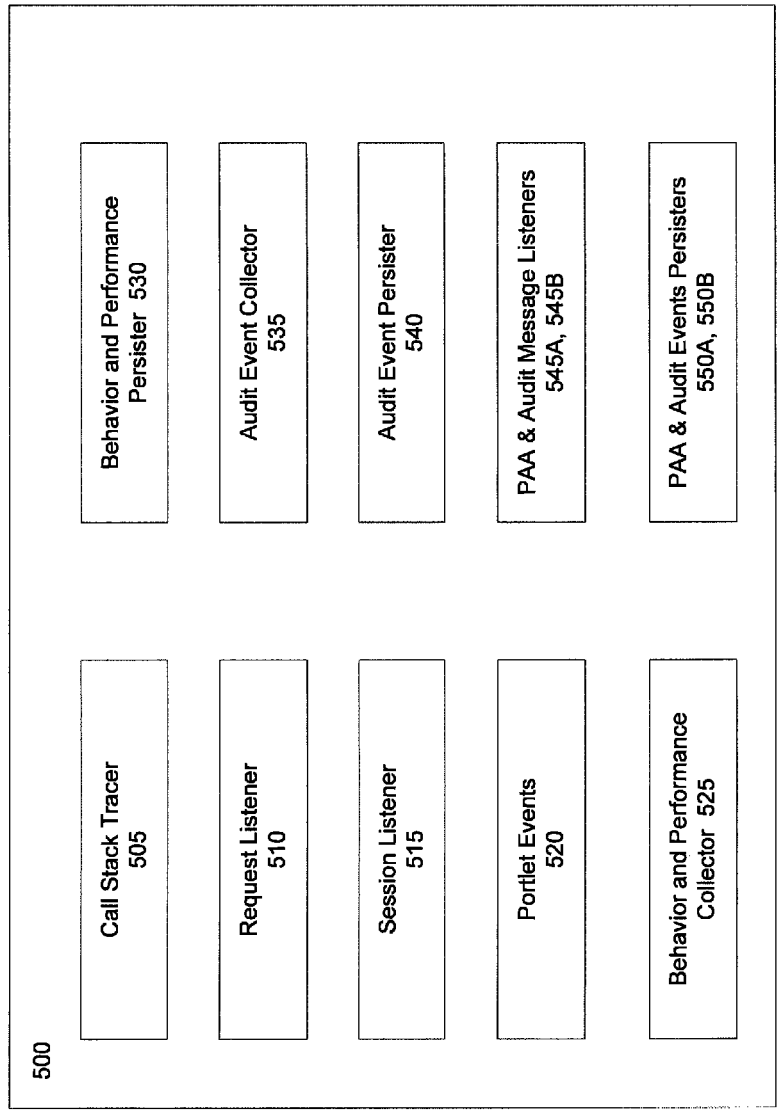
FIG. 5 is a block diagram that illustrates some details of an example embodiment of the performance, analytics and auditing framework illustrated in FIG. 1.

FIG. 5 is a block diagram that illustrates an example embodiment of the subcomponents of the PAA framework illustrated in FIG. 1. Diagram 500 includes the following subcomponents: call stack tracer 505, request listener 510, session listener 515, portlets events 520, behavior and performance collector 525, audit event collector 530, audit message listener 535 and audit events persists 510. The subcomponents 505-540 may be associated with the behavior tracking component 110, the performance monitoring component 115, the auditing component 120 and the alert component 125.

The call stack tracer 505 is configured to incorporate a child transaction to its parent transaction. For some embodiments, every request that enters the java virtual machine (JVM) is assigned a unique ID. This unique ID is then set in the Thread Local and Request Attributes. This ensures that for any subsequent calls caused by this request, the parent request can be identified. The entire call stack can be similarly maintained for the entire code flow. When a separate JVM is called, the unique ID is passed along with the request, and the code of the PAA framework 100 residing in the receiving JVM will incorporate the child transaction to the parent transaction. FIG. 6B is flow diagram that illustrates an example embodiment of a process performed by the call stack tracer 505 illustrated in FIG. 5.

The request listener 510 is configured to listen to all the new requests received by the Java 2 Platform, Enterprise Edition (J2EE) application. J2EE is a Java platform designed for the mainframe-scale computing typical of large enterprises. The request listener 510 tags the request by setting a unique ID in Thread Local and Request Attributes. The request listener 510 also collects information about an amount of time spent to fulfill the request.

The session listener 515 is configured to listen to all new session requests received by the J2EE application. The session listener 515 sets the session ID in the Thread Local so that the Event Persister will extract the session information along with all events. FIGS. 6C-6D are flow diagrams that illustrate example embodiments of a process performed by the call listener 510 and session listener 515 illustrated in FIG. 5.

The portlets events 520 is used by the portal containers that as portlet events to be tracked. The portlets events 520 include actions such as minimize, maximize, close, edit, etc. on the portlet.

The behavior tracking and performance monitoring event collector 525 is configured to collect performance numbers across all java classes in the JVM. The java classes can be selected using a pointcut expression as allowed by the Aspect Oriented Programming Language like AspectJ. FIGS. 6E-6F are flow diagrams that illustrate example embodiments of a process performed by the portlet events 520 and behavior and performance collector 525 illustrated in FIG. 5.

The behavior and performance persister 530 is configured to collect all the events and persists it to a Java Messaging Service (JMS) implementation.

The audit event collector 535 is configured to collect all the auditing information. The classes which perform the critical events can be selected using a pointcut expression as allowed by the Aspect Oriented Programming Language like AspectJ. All the auditing events are then written on store and forward JMS. The auditing events are more critical and cannot be lost even if the system fails. Hence, the store and forward mechanism is used. FIGS. 6G-6H is flow diagram that illustrates an example embodiment of a process performed by the behavior and performance persister 530 and audit even collector 535 illustrated in FIG. 5.

The audit event persister 540 is configured to extract the event detail from the audit event collector 535. The audit event persister 540 also extracts the user name, user IP address, host IP address, timestamp, and performance numbers to execute the event. FIG. 6I is flow diagram that illustrates an example embodiment of a process performed by the audit event persister 540 illustrated in FIG. 5.

The PAA and audit message listeners 545A, 545B are configured to listen to the JMS messages posted by the event persister 540 on the J2EE web application that is having operating with the PAA framework 100. The PAA and audit message listeners 545A-B invoke the alert components in case a predefined exception occurs or a predefined SLA is violated by any component. FIG. 6J is flow diagram that illustrates an example embodiment of a process performed by the audit event persister 545A and 545B illustrated in FIG. 5.

The audit event persister 550 is configured to persists the events into the database. Reports may then be generated from these persisted events.

Figure 6A:
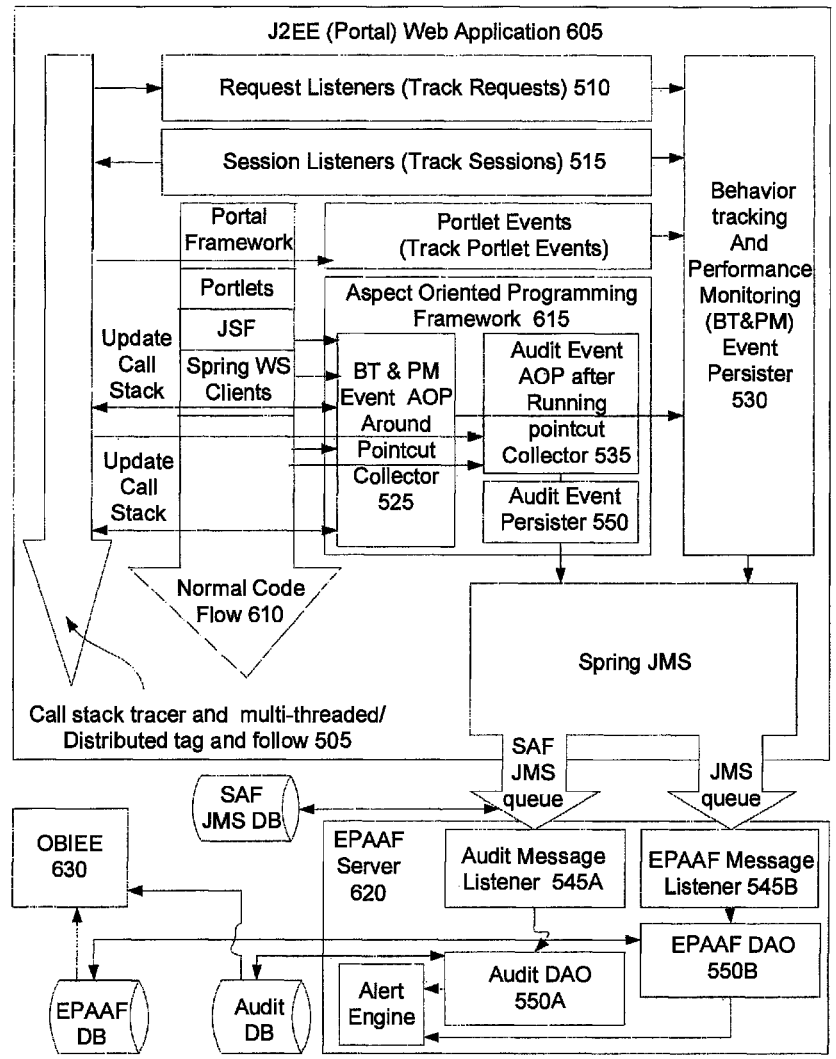
FIG. 6A is a block diagram that illustrates some details of an example embodiment of the operations of the components of the performance, analytics and auditing framework illustrated in FIG. 5.
Figure 6B:
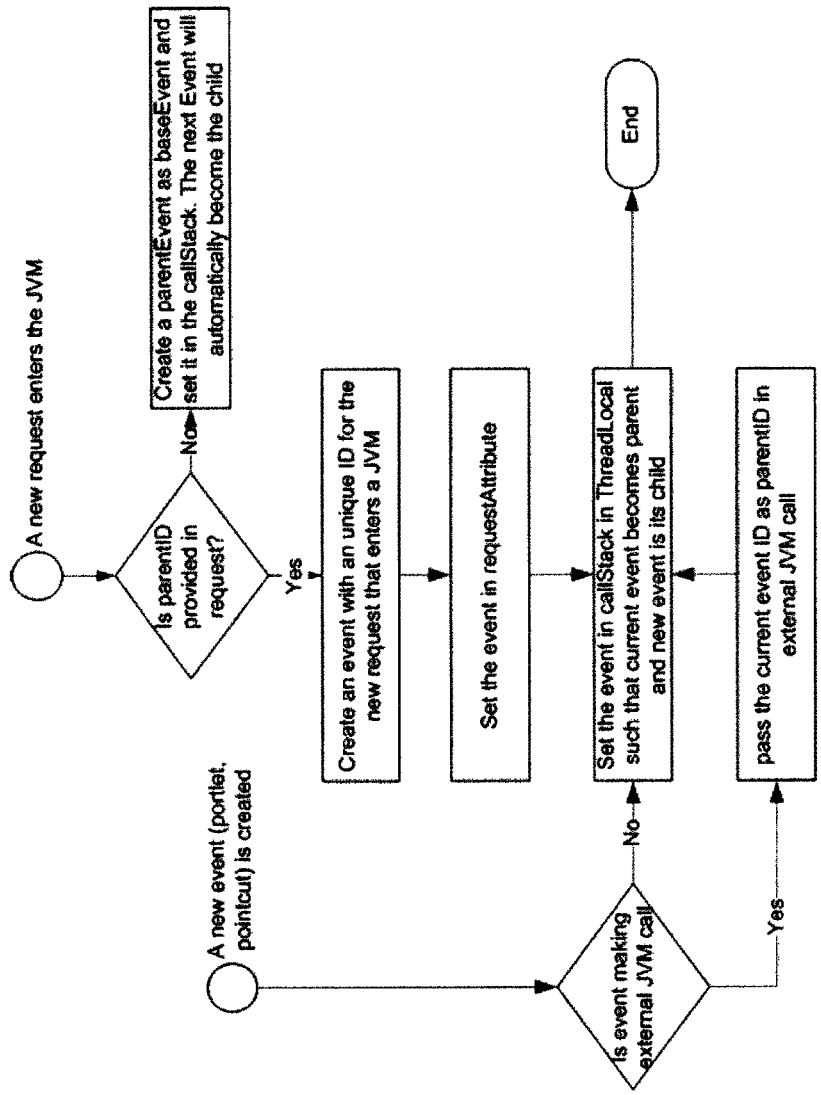
FIG. 6B is flow diagram that illustrates an example embodiment of a process performed by the call stack tracer.
Figure 6D:
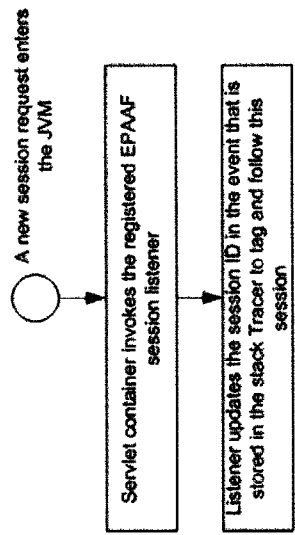
FIG. 6CD is flow diagram that illustrates an example embodiment of a process performed by the call listener and session listener.
FIG. 6EF is flow diagram that illustrates an example embodiment of a process performed by the portlet events and behavior and performance collector.
FIG. 6GH is flow diagram that illustrates an example embodiment of a process performed by the behavior and performance persister and audit event collector.
FIG. 6I is flow diagram that illustrates an example embodiment of a process performed by the audit event persister.
FIG. 6J is flow diagram that illustrates an example embodiment of a process performed by the audit event persister.
Figure 6C:
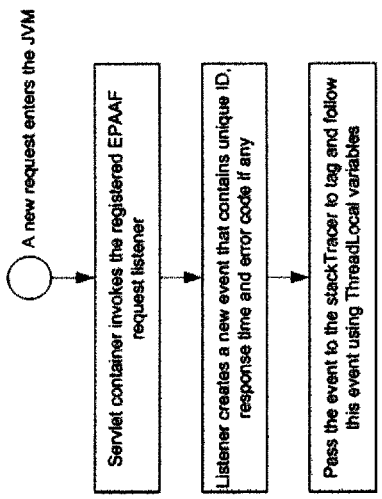
Figure 6F:
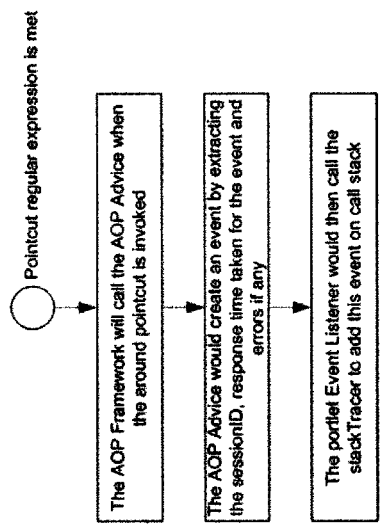
Figure 6E:
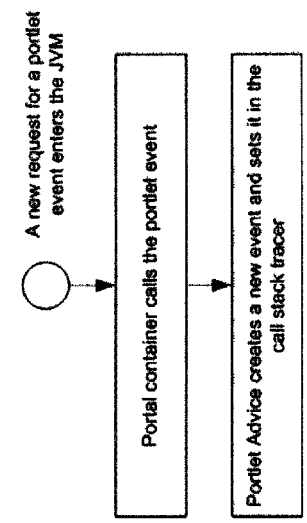
Figure 6H:
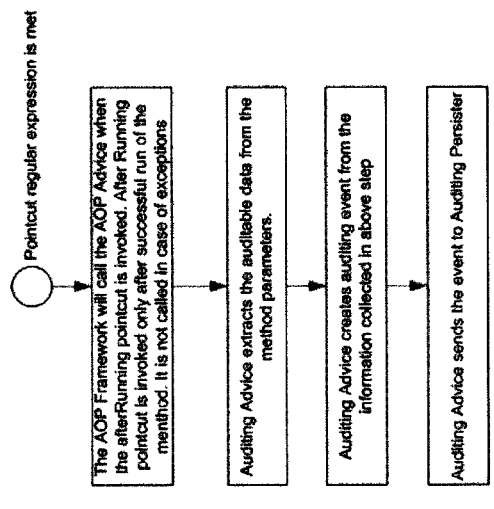
Figure 6G:
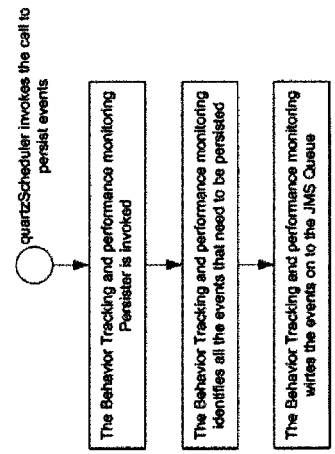
Figure 6I:
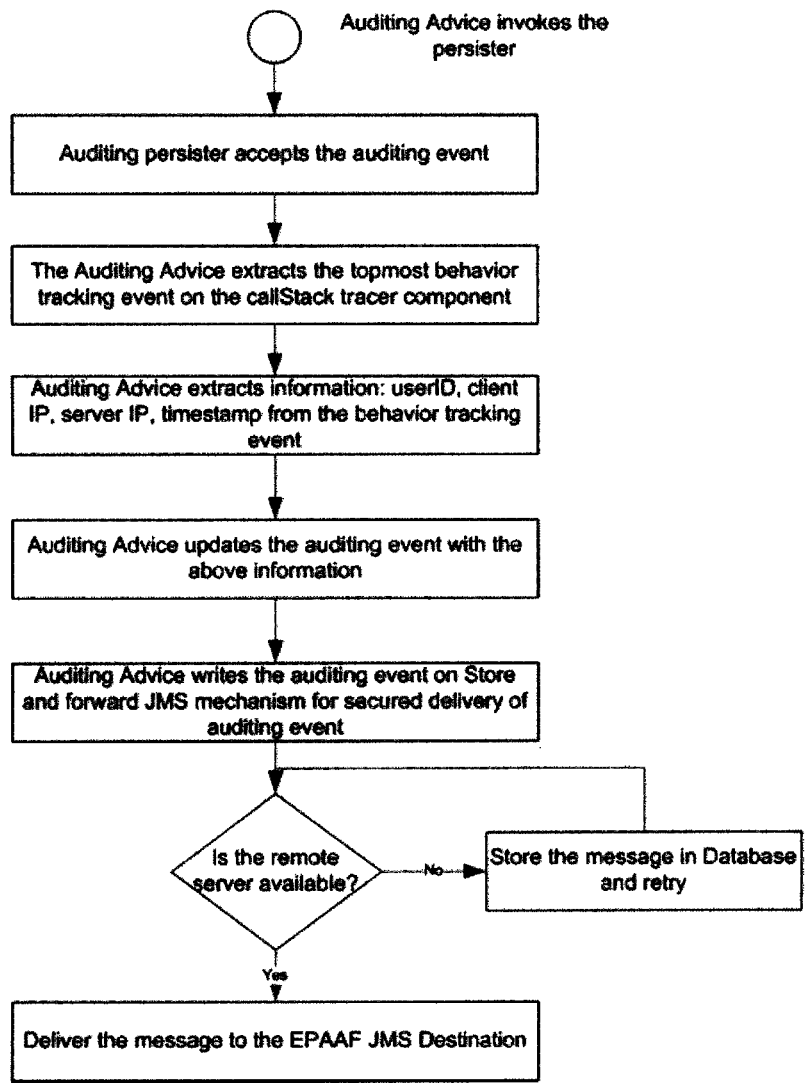
Figure 6J:
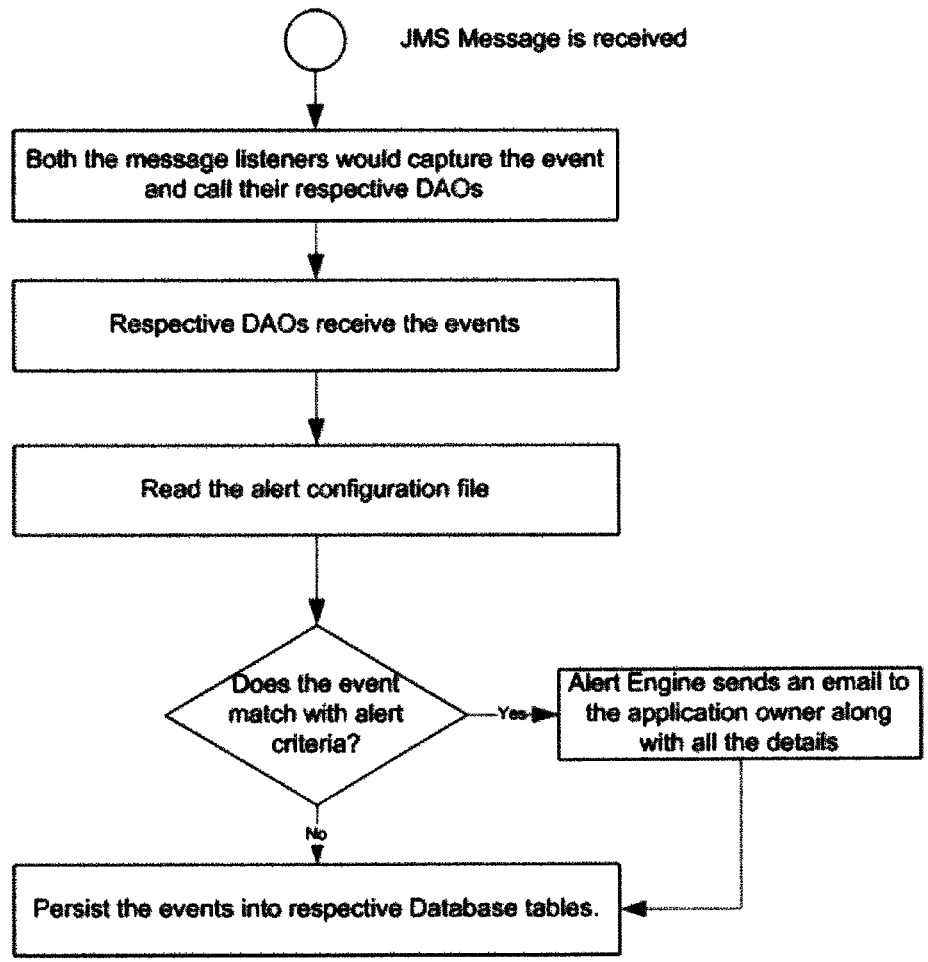

FIG. 6A is a block diagram that illustrates some details of an example embodiment of the operations of the subcomponents of the PAA framework when incorporating with the operation of the portal application. Diagram 600 includes portal application 605 and PAA server 620. Illustrated inside portal application 605 are the subcomponents of the PAA framework including some of the subcomponents described in FIG. 5. It should be noted that FIG. 6A is used to illustrate the operations of these subcomponents rather than where the codes associated with these subcomponents are actually stored. Block 610 illustrates the normal flow of a portal framework, similar to the operations of the portal framework 340 illustrated in FIG. 3. Block 630 illustrates Oracle Business Intelligence Enterprise Edition (OBIEE) that may be used to generates report based on audit information stored in the database 622 and performance and analytics information stored in the database 624. Block 615 illustrates subcomponents that are implemented using Aspect Oriented Programming framework. These include the subcomponents behavior tracking and performance monitoring collector 525, the audit event collector 535, and the audit event persister 550. It may be noted that FIG. 6A illustrates connections between the subcomponents themselves as well as connections between some subcomponents and the portal framework 610. Each of these connections may represent a flow of information that is captured by one of the subcomponents of the PAA framework 100.

Network Environment

Figure 7:
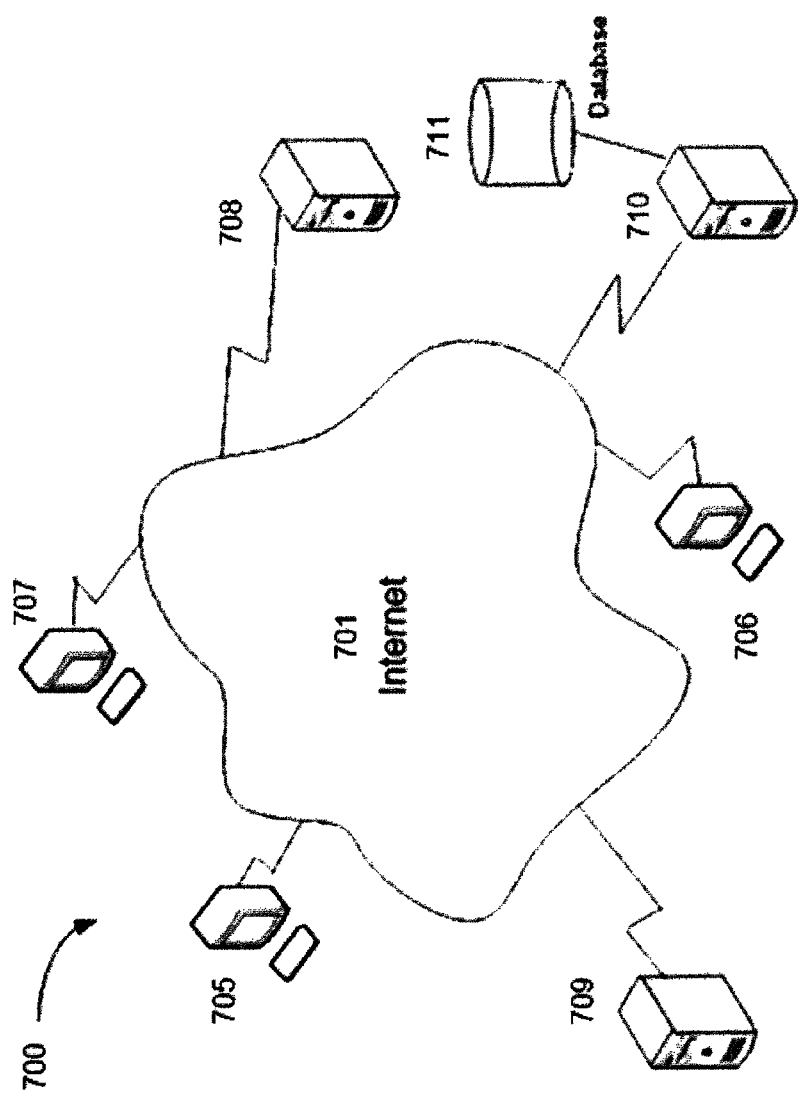
FIG. 7 is a network diagram illustrating an example embodiment of a network environment that may be used.

FIG. 7 is a network diagram illustrating an example embodiment of a network environment that may be used. Network environment 700 has a network 701 that connects with server computers 708 through 710 and client computers 705 through 707. Network environment 700 may also be referred to as a client-server environment. As illustrated, several server computers 708 to 710 and several client computers 705 to 707 are connected to and communicate with one another via the network 701, which may be, for example, an on-chip communication network. Note that alternatively the network 780 might be or include one or more of: inter-chip communications, an optical network, the Internet, a Local Area Network (LAN), Wide Area Network (WAN), satellite link, fiber network, cable network, or a combination of these and/or others. Note that the number of client computers and server computers illustrated in FIG. 7 are used as examples only and is not meant to be restrictive.

The server computers 708 to 710 may represent, for example: a master device on a chip; a server system; an intellectual property core, such as a microprocessor, communications interface, etc.; a disk storage system; and/or computing resources. Likewise, the client computers 705 to 707 may have computing, storage, and viewing capabilities. The method and apparatus described herein may be applied to essentially any type of communicating means or device whether local or remote, such as a LAN, a WAN, a system bus, on-chip bus, etc.

It is to be further appreciated that the use of the term client computer and server computer is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as the client computer 705 and the server computer 708 can both initiate and respond to communications, their communication may be viewed as peer-to-peer. Likewise, communications between the server computers 708 and 709 and client computers 705 and 706 may be viewed as peer to peer if each such communicating device is capable of initiation and response to communication.

FIG. 7 also illustrates an embodiment of a server computer to display the application on a portion of a media space, such as a web page, a profile page on a portal such as that provided by a service provider, etc. The application may be embedded into a third party's media space, such as an HTML web page, a page of a portal, etc. The application when executed on a server 709 causes the server 709 to display windows and user interface screens on a portion of a media space such as a web page. A user from a client computer 705 may interact with the page that contains the embedded application, and then supply input to the query/fields and/or service presented by a user interface of the application. The web page may be served by a web server 708 on any HTML or wireless access protocol (WAP) enabled client computer 705 or any equivalent thereof such as a mobile device or personal computer. The client computer 705 may include browser software (e.g., Firefox) to access the web-based anticipatory design tools hosted by one or more of the server computers 708 to 710.

For some example embodiments, the PAA framework 100 may include codes scripted to execute on the server computer 710 to allow interaction with a user and to present customized interface to a user. The PAA framework 100 may include codes scripted to execute on the server computer 710 to cause information stored in the database 711 to be retrieved. The codes of the PAA framework 100 may also be configured to receive information from the portal applications 200 and to generate reports based on the information received from the portal applications 200. The relational database 711 may be associated with a database server such as, for example, the server computer 710. The relational database 711 may store information similar to the information stored in the database 130 illustrated in FIG. 1.

Computing Environment

Figure 8:
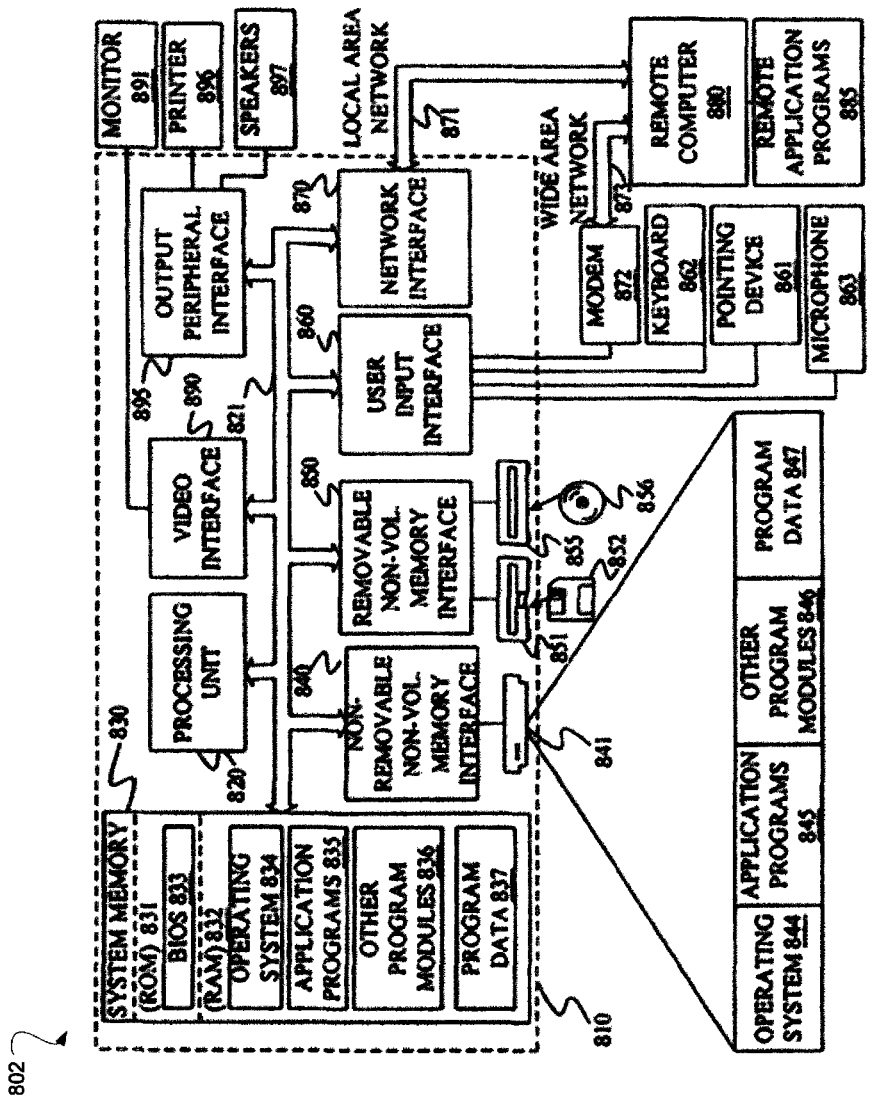
FIG. 8 is a computing environment example embodiment that may be used.

FIG. 8 is an example computing environment that may be used with some embodiments of the invention. Computing environment 802 is only one example of a suitable computing environment and is not intended to suggest any limitations as to the scope of use or functionality of the embodiments of the present invention. Neither should the computing environment 802 be interpreted as having any dependency or requirement relating to any one or combination of components illustrated in FIG. 8.

Embodiments of the invention may be operational with general purpose or special purpose computer systems or configurations. Examples of well known computer systems that may be used include, but are not limited to, personal computers, server computers, hand-held or laptop devices, Tablets, Smart phones, Netbooks, multiprocessor systems, microprocessor-based systems, set top boxes, programmable consumer electronics, network PCs, minicomputers, mainframe computers, distributed computing environments that include any of the above systems or devices, and the like.

Embodiments of the present invention may be described in the general context of computer-executable instructions, such as program modules, being executed by a computer system. Generally, program modules include routines, programs, databases, objects, components, data structures, etc. that performs particular tasks or implement particular abstract data types. Those skilled in the art can implement the description and/or figures herein as computer-executable instructions, which can be embodied on any form of computer readable media discussed below.

Embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 8, the computing environment 802 includes a general-purpose computer system 810. Components of the computer system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer system 810 typically includes a variety of computer readable media. Computer readable media can be any available media that can be accessed by computer system 810 and includes both volatile and nonvolatile media, removable and non-removable media. By way of example, and not limitation, computer readable mediums uses include storage of information such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer system 810. Communication media typically embodies computer readable instructions, data structures, program modules or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer system 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer system 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer system 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. The operating system 844, the application programs 845, the other program modules 846, and the program data 847 are given different numeric identification here to illustrate that, at a minimum, they are different copies.

A participant may enter commands and information into the computer system 810 through input devices such as a keyboard 862, a microphone 863, and a pointing device 861, such as a mouse, trackball or touch pad. Other input devices (not shown) may include a joystick, game pad, scanner, or the like. These and other input devices are often connected to the processing unit 820 through a user input interface 860 that is coupled to the system bus 821, but may be connected by other interface and bus structures, such as a parallel port, game port or a universal serial bus (USB). A monitor 891 or other type of display device is also connected to the system bus 121 via an interface, such as a video interface 890. In addition to the monitor, computers may also include other peripheral output devices such as speakers 897 and printer 896, which may be connected through an output peripheral interface 890.

The computer system 810 may operate in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer system 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer system 810 is connected to the LAN 871 through a network interface or adapter 870. When used in a WAN networking environment, the computer system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer system 810, or portions thereof, may be stored in a remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should be noted that some embodiments of the present invention may be carried out on a computer system such as that described with respect to FIG. 8. However, some embodiments of the present invention may be carried out on a server, a computer devoted to message handling, handheld devices, or on a distributed system in which different portions of the present design may be carried out on different parts of the distributed computing system.

Another device that may be coupled to the system bus 821 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 872 may employ a Wireless Application Protocol to establish a wireless communication channel. The communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a tablet computer, Netbook, cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Flow Diagram

Figure 9A:
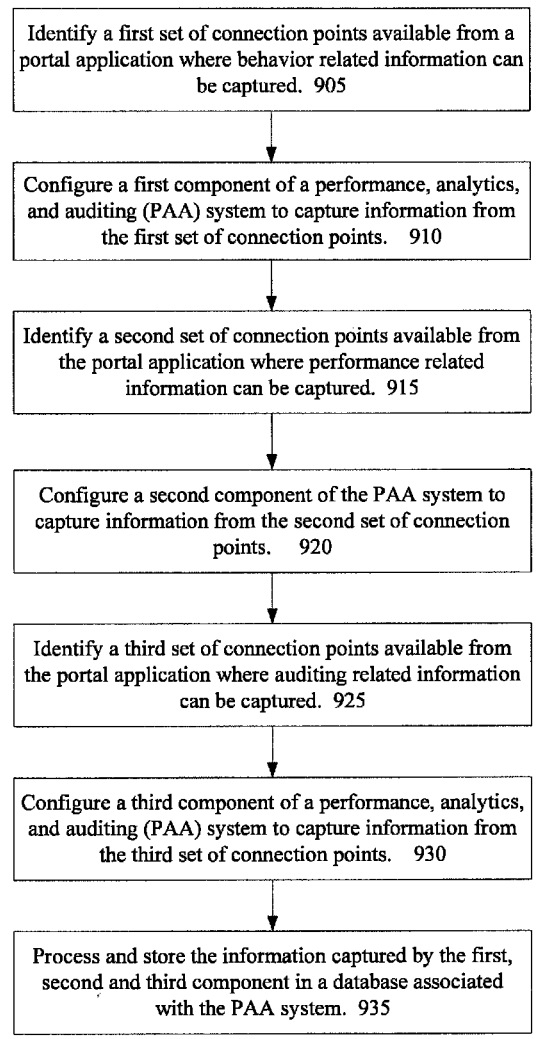
FIG. 9A is an example flow diagram that illustrates a process that enables capturing performance, analytics and auditing information using the performance, analytics and auditing framework.

FIG. 9A is an example flow diagram that illustrates a process that enables capturing performance, analytics and auditing information using the performance, analytics and auditing framework.

In block 905, a first set of connection points available from a portal application where behavior related information can be captured is identified. In block 910, a behavior tracking (or first) component of a PAA system is configured to capture behavior related information from the first set of connection points.

In block 915, a second set of connection points available from the portal application where performance related information can be captured is identified. In block 920, a performance monitoring (or second) component of the PAA system is configured to capture performance related information from the second set of connection points.

In block 925, a third set of connection points available from the portal application where auditing related information can be captured is identified. In block 930, an auditing (or third) component of the PAA system is configured to capture auditing related information from the third set of connection points.

In block 935, the information captured by the first, second and third component may be processed and stored in a database associated with the PAA system. For some embodiments, the database associated with the PAA system may include database tables configured to store the information captured by the first, second and third components. The database may also store other information such as, for example, alert information, reports, etc. Alternatively, the audit information may be stored in a separate database. As can be noted from the blocks of the process described above, the first, second and third components are part of the PAA system (also referred to earlier as the PAA framework.)

Figure 9B:
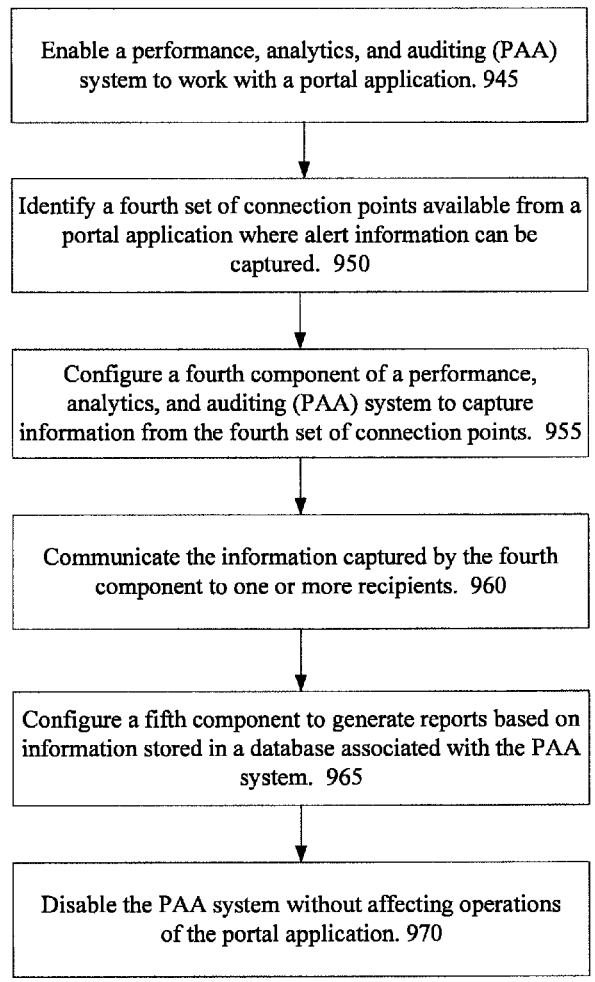
FIG. 9B is an example flow diagram that illustrates a process that enables capturing alert information and generating reports based on the information captured by the PAA framework.

FIG. 9B is an example flow diagram that illustrates a process that enables capturing alert information and generating reports based on the information captured by the PAA framework.

In block 945, a PAA system is enabled to work with a portal application. Enabling the PAA system and operations of the components of the PAA system are not to be intrusive to the portal application. In block 950, a fourth set of connection points available from the portal application where alert related information can be captured is identified. In block 955, an alert (or fourth) component of the PAA system is configured to capture alert related information from the fourth set of connection points. In block 960, the captured alert related information may be communicated to one or more recipients. For some embodiments, the communication may be by email.

In block 965, a reporting (or fifth) component of the PAA system is configured to generate reports based on the information stored in the database associated with the PAA system. In block 970, the PAA system may be disabled without affecting the operations of the portal application.

It may be noted that the although the operations described in FIGS. 9A and 9B follow a certain sequence, some operations may be performed out of sequence from the other operations and/or some operations may not be performed at all.

From the above, some embodiments of the invention include systems and methods that include a behavior tracking component configured to capture activities of a user when interacting with the portal application; a performance monitoring component coupled to the behavior tracking component and configured to determine performance information relating to the activities of the user when interacting with the portal application; an auditing component coupled to the behavior tracking component and the performance monitoring component and configured to capture event details related to the activities of users when interacting with the portal application, wherein the behavior tracking component, the performance monitoring component and the auditing component operate together in a framework and in a non-intrusive manner with regard to the portal application, and wherein the framework is coded using Aspect Oriented Programming (AOP). The behavior tracking component, the performance monitoring component and the auditing component operate together in the framework collecting data seamlessly from multiple threads spawned for efficient parallel processing of user's requests within the portal application.

The methods and systems may further comprise an alert component in the framework and configured to communicate alerts and exceptions associated with the portal application to a recipient. The information captured or determined by the behavior tracking component, the performance monitoring component and the auditing component is stored in a database associated with the framework, and wherein the system further comprises a reporting component to generate reports based on the information stored in the database. The PAA framework is configured to start or stop operating with the portal application at runtime with minimal impact on operations of the portal application, and wherein the framework is configured to use asynchronous Java Message Service (JMS) queues to reduce runtime overhead.

While some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa.

The different functions described herein may be performed by hardware, software, or a combination of both. The portions of that function implemented in software are stored on the machine-readable medium and have executable instruction to cause the machine to carry out that function. The invention is to be understood as not limited by the specific embodiments described herein, but only by scope of the appended claims.

We claim:

1. A computer system comprising:
   one or more server computers each comprising at least one hardware-based processor;
   a network exchange including a portal application and associated subsystems; and
   a first framework for capturing information from web applications on the network exchange, the first framework including:
   a first database,
   a behavior tracking component executed by the one or more server computers and configured to capture data relating to activities of a user when the user interacts with the portal application and store the data relating to activities in the first database,
   a performance monitoring component coupled to the behavior tracking component, the performance monitoring component executed by the one or more server computers and configured to determine performance information relating to the activities of the user when the user interacts with the portal application and store the performance information in the first database, and
   an auditing component coupled to the behavior tracking component and the performance monitoring component, the auditing component executed by the one or more server computers and configured to capture event details related to the activities of users when the user interacts with the portal application and store the event details in the first database,
   wherein the behavior tracking component, the performance monitoring component, and the auditing component operate together in the first framework, and wherein the first framework components are coded using Aspect Oriented Programming (AOP), and wherein the behavior tracking component, the performance monitoring component, and the auditing component operate together in the first framework collecting data from multiple threads spawned for efficient parallel processing of users' requests within the portal application regarding the network exchange, wherein the portal application includes:
   a server portal having including a second framework and one or more presentation components executed by the one or more server computers and configured to allow the user to interact with the portal application regarding the network exchange, and
   a second database to store information regarding the network exchange.

2. The computer system of claim 1, wherein the behavior tracking component is further configured to collect all the activities that the user does on a portal associated with the portal application including at least login, logout, and page visits activities.

3. The computer system of claim 2, wherein the performance monitoring component is further configured to measure real time performance numbers of various subsystems of the portal application, including calculating performance numbers of the activities of the users as captured by the behavior tracking component.

4. The computer system of claim 3, wherein the performance monitoring component is further configured to provide drill-down of the performance numbers at various subsystems including at least portlets, Javaserver Faces (JSF), database calls and remote called subsystems.

5. The computer system of claim 4, wherein the auditing component is further configured to capture at least event details of critical events and associate the event details with a user that is involved in the events together with a time when the events occur, and wherein the remote called subsystems include web services.

6. The computer system of claim 5, further comprising an alert component in the framework and configured to communicate alerts and exceptions associated with the portal application to a recipient.

7. The computer system of claim 6, further comprising a reporting component configured to generate reports based on the information stored in the first database.

8. The computer system of claim 1, wherein the first framework components are configured to start or stop operating with the portal application at runtime, and wherein the first framework components are configured to use asynchronous Java Message Service (JMS) queues.

9. A method for managing operations of a portal comprising:
   identifying a first set of connection points available from a portal application where behavior related information associated with activities of users interacting with the portal application can be captured;
   configuring a first component of a performance, analytics and auditing (PAA) system to capture information from the first set of connection points;
   identifying a second set of connection points available from the portal application where performance related information associated with the activities of the users interacting with the portal application can be captured;
   configuring a second component of the PAA system to capture information from the second set of connection points;
   identifying a third set of connection points available from a portal application where auditing related information associated with the activities of the users interacting with the portal application can be captured;
   configuring a third component of the PAA system to capture information from the third set of connection points; and storing the captured information in a database associated with the PAA system, wherein components of the PAA system are coded using Aspect Oriented Programming (AOP) and are configured to operate with the portal application, and wherein the components of the PAA system operate together collecting data from multiple threads spawned for efficient parallel processing of users' requests within the portal application.

10. The method of claim 9, wherein the second component and the third component are configured to use the information captured by the first component to determine the performance related information and the auditing related information, respectively.

11. The method of claim 9, wherein the first component is further configured to capture information relating to activities performed by the users on a portal associated with the portal application.

12. The method of claim 11, wherein the second component is configured to measure real time performance numbers of various subsystems of the portal application, including calculating performance numbers of the activities performed by the users as captured by the first component.

13. The method of claim 11, wherein the second component is further configured to provide drill-down of the performance numbers at the various the subsystems including at least portlets, Javaserver Faces (JSF), database calls and remotely called sub systems.

14. The method of claim 12, wherein the third component is further configured to capture at least event details of critical events, and wherein the third component is configured to associate the captured event details with a user who is involved in the events together with time information indicating when the events occur.

15. The method of claim 14, further comprising configuring a fourth component of the PAA system to communicate alerts and exceptions associated with the portal application to a recipient.

16. The method of claim 15, further comprising configuring a fifth component of the PAA system to generate reports based on the information stored in the database associated with the PAA system.

17. The method of claim 9, wherein the PAA system is configured to start or stop operating with the portal application at runtime.

18. The method of claim 17, wherein the PAA system is configured to use asynchronous Java Message Service (JMS) queues.

19. A non-transitory computer-readable medium that stores instructions, which when executed by a machine, cause the machine to perform operations comprising:
identifying a first set of connection points available from a portal application where behavior related information associated with activities of users interacting with the portal application can be captured;
configuring a first component of a performance, analytics and auditing (PAA) system to capture information from the first set of connection points;
identifying a second set of connection points available from the portal application where performance related information associated with the activities of the users interacting with the portal application can be captured;
configuring a second component of the PAA system to capture information from the second set of connection points;
identifying a third set of connection points available from a portal application where auditing related information associated with the activities of the users interacting with the portal application can be captured;
configuring a third component of the PAA system to capture information from the third set of connection points; and
storing the captured information in a database associated with the PAA system, wherein components of the PAA system are coded using Aspect Oriented Programming (AOP) and are configured to operate with the portal application, and wherein the components of the PAA system operate together collecting data from multiple threads spawned for efficient parallel processing of users' requests within the portal application.

* * * * *